(12) United States Patent
Glass

(10) Patent No.: US 11,930,979 B2
(45) Date of Patent: Mar. 19, 2024

(54) ENERGY RECOVERY SYSTEM FOR HEATED WATER

(71) Applicant: William K. Glass, Estero, FL (US)

(72) Inventor: William K. Glass, Estero, FL (US)

(73) Assignee: William K. Glass, Estero, FL (US)

( * ) Notice: Subject to any disclaimer, the term of this patent is extended or adjusted under 35 U.S.C. 154(b) by 0 days.

(21) Appl. No.: 17/821,186

(22) Filed: Aug. 21, 2022

(65) Prior Publication Data

US 2023/0077344 A1 Mar. 16, 2023

Related U.S. Application Data

(62) Division of application No. 15/561,462, filed as application No. PCT/US2016/024570 on Mar. 28, 2016, now Pat. No. 11,419,474.

(Continued)

(51) Int. Cl.
*A47L 15/00* (2006.01)
*A47L 15/42* (2006.01)
(Continued)

(52) U.S. Cl.
CPC ....... *A47L 15/0047* (2013.01); *A47L 15/0049* (2013.01); *A47L 15/4285* (2013.01); *A47L 15/4287* (2013.01); *A47L 15/46* (2013.01); *F01K 5/00* (2013.01); *F22B 31/00* (2013.01); *F24D 11/005* (2013.01); *F24D 17/0052* (2013.01); *F24D 19/1051* (2013.01); *F28D 21/0012* (2013.01); *A47L 15/0057* (2013.01); *A47L 15/0076* (2013.01); *A47L 2301/08* (2013.01); *A47L 2401/09* (2013.01); *A47L 2401/12* (2013.01); *A47L 2401/14* (2013.01); *A47L 2401/34* (2013.01); *A47L 2501/01* (2013.01); *A47L 2501/02* (2013.01); *A47L 2501/26* (2013.01); *A47L 2501/36* (2013.01); *D06F 39/006* (2013.01); *F24D 2200/20* (2013.01); *Y02B 10/70* (2013.01); *Y02B 30/18* (2013.01)

(58) Field of Classification Search
CPC .......... A47L 15/00; A47L 15/42; A47L 15/46; A47L 15/0047; A47L 15/4285; A47L 15/4287; A47L 15/0057; A47L 15/0049; F24D 17/00; F24D 19/10; F24D 11/00; F24D 17/0052; F24D 11/05; F24D 19/1051; F22B 31/00; F01K 5/00; F28D 21/00; F28D 21/0012
See application file for complete search history.

(56) References Cited

U.S. PATENT DOCUMENTS

| | | | |
|---|---|---|---|
| 2009/0242005 A1* | 10/2009 | Gaus | A47L 15/4291 134/107 |
| 2011/0048342 A1* | 3/2011 | Vroom | A47L 15/4285 122/367.1 |
| 2016/0003564 A1* | 1/2016 | Théberge | F28F 1/003 165/104.31 |

FOREIGN PATENT DOCUMENTS

| | | | | |
|---|---|---|---|---|
| CN | 203785026 U | * | 8/2014 | |
| GB | 2271503 A | * | 4/1994 | A47L 15/4285 |

* cited by examiner

*Primary Examiner* — Harry E Arant
(74) *Attorney, Agent, or Firm* — Accel IP Law, PLLC; Ferdinand M. Romano

(57) ABSTRACT

A free-standing Energy Recovery System enables sanitary recovery of thermal energy with heat transfer from hot waste effluent to incoming domestic water. The source of the effluent may, for example, be conventional commercial ware-washing, clothes washing equipment, pasteurization and other industrial processes.

9 Claims, 9 Drawing Sheets

Related U.S. Application Data

(60) Provisional application No. 62/138,477, filed on Mar. 26, 2015.

(51) Int. Cl.
*A47L 15/46* (2006.01)
*F01K 5/00* (2006.01)
*F22B 31/00* (2006.01)
*F24D 11/00* (2022.01)
*F24D 17/00* (2022.01)
*F24D 19/10* (2006.01)
*F28D 21/00* (2006.01)
*D06F 39/00* (2020.01)

ENERGY RECOVERY SYSTEM FOR HEATED WATER

This application is the U.S. National Stage Entry of PCT/US2016/024570, filed Mar. 28, 2016, which claims priority to provisional patent application Ser. No. 62/138,477 filed Mar. 26, 2015.

FIELD OF THE INVENTION

The invention relates generally to conservation of thermal energy and, more particularly, to equipment and methods for transfer of energy from waste water for reuse in commercial applications.

BACKGROUND OF THE INVENTION

Conventionally, dishwasher operations have required sanitary heated water generated from a municipal water supply. The hot water is often provided by preheating normally cold water to a temperature in the range of 150° F. (66° C.) with a conventional water heater or boiler. A hot water supply line carries the preheated domestic water into a booster water heater for further temperature elevation (e.g., to a temperature of 180° F. (82° C.) or higher) prior to initial use in the final rinse cycle of a sanitary dishwasher. On demand, the water coming out of the booster water heater is fed into the dishwasher for execution of automated or manually controlled cleaning and rinse cycles. For a given cycle the discharged water, referred to as effluent or waste water, typically exits the dishwasher at or slightly below the cycle operating temperature. Upon exit from the dishwasher, the relatively hot waste water normally enters a gravity feed open drain line and is commonly sent into a grease trap and then to a sewer line which receives effluent from multiple other waste water sources before entering a municipal system. It is common to require that the hot waste water be cooled via tempering (e.g., diluting with cooling water) before entering the grease trap. Tempering can prevent the grease trap from receiving waste water with such substantial heat as to prevent liquid grease present in the effluent from depositing in the grease trap and can prevent melting of previously deposited fatty solids which would then flow into the sewer system where they redeposit and possibly clog a municipal line.

Traps and interceptors are commonly placed in the drain lines of food service establishments to separate particulates and grease from hot effluent waste water normally dumped after ware-washing and cooking. Local codes normally dictate the volumetric sizes of grease traps, based on estimated maximum volumes of grease laden waste water expected to enter drains leading to sewer systems. These estimates are often based on the product of a volume of waste water generated per customer and the seating capacity of a food service establishment. The code requirements are intended to prevent grease laden waste water from entering the sewer system. Minimum volumetric size requirements for grease traps assure sufficient heat dissipation and cooling to separate the grease from the water and retain the grease in the trap while permitting the water to flow into the sewer system. Sizing is based on maximum discharge rates and providing sufficient rates of heat dissipation, from surrounding water, walls and soil, to assure grease solidification occurs before the effluent passes from the trap. This prevents essentially all of the grease from entering the sewer system. Often the sizing calculation is determined by the maximum temperature from which the hot effluent must be cooled (e.g., cooled to under 100° F. (38° C.)) while flowing through the trap to solidify the grease. If the local authority detects grease in a segment of sewer downstream of a grease trap and then concludes that the trap is not adequately sized, the food service operator may be required to temper the hot effluent before it enters the trap. This relatively rapid precooling, although water consumptive, has been one of the few practical means of assuring that substantially all grease carried in the effluent solidifies within the trap.

SUMMARY OF THE INVENTION

The invention is useful in contexts where a heat recovery system (also referred to as a thermal transfer system) and method enable reuse of otherwise discarded thermal energy in a wide variety of industrial applications. In those applications that consume heated water, such as for ware washing in the food service industry, a recovery system according to the invention can be advantageously applied to reduce volumetric requirements for processing waste water exiting a food service establishment prior to entry into a sewer system.

In one series of embodiments, a thermal transfer system is provided for operation with a water consuming industrial apparatus (e.g., a commercial dishwasher, a commercial clothes washer or other water intensive processing equipment) a type conventionally connected to receive potable water which passes along a first path from a water supply and through a first water heater to provide a flow of heated potable water with which the apparatus performs processing. The apparatus also has a conventional connection to effect discharge of effluent, comprising the heated water used in the processing, into a drain. The thermal transfer system includes a controller and a heat exchange device. During operation of the system the heat exchange device receives a flow of relatively cool potable water from the water supply without water in the flow first undergoing active heating. The heat exchange device also receives a flow of the effluent discharged from the appliance. The device is configured to transfer thermal energy from the effluent to the potable water to elevate the temperature of the potable water to provide a flow of relatively hot potable water in the flow. The device is connected in the system for selective provision of relatively hot potable water along a second path to the industrial appliance in lieu of heated potable water flowing along the first path from the first water heater to the industrial apparatus. The controller selectively provides a flow of the water along the second path to the industrial appliance by determining that the temperature and volume of effluent available for thermal transfer within the heat exchange device are sufficient to generate a requisite supply of relatively hot potable water to meet a predetermined condition (e.g., a minimum temperature of the effluent) for operation of the industrial appliance. In one embodiment the first and second paths of the thermal transfer system each provide for flow of preheated water through a booster water heater for further temperature elevation, in accord with another predetermined condition (e.g., a minimum volume of effluent available at the minimum temperature in a holding tank), before the industrial apparatus utilizes the preheated water to perform processing. The thermal transfer system may also include a holding tank connected to receive effluent from the industrial apparatus and provide the effluent to the heat exchange device. A holding tank includes sensors which provide signals to the controller indicating relative levels of effluent in the holding tank, with the controller responsive to a relatively low effluent level by causing a fluid line to add fluid to the holding tank, and responsive to a relatively high effluent level by causing a portion of the effluent to flow from the holding tank to flow to the drain. When the controller causes a portion of the effluent to flow from the holding tank to the drain, the effluent may flow through the heat exchange device to the drain.

In accord with the above-described embodiments, operation with the conventional connection provides flow along the first path, followed by discharge of the effluent from the industrial apparatus into a drain line for flow into a grease trap for which, immediately before entry into the grease trap, with the flow of effluent in the drain line characterized by a first and relatively high effluent temperature. The controller selectively provides a flow of heated potable water along the first path from the first water heater to the industrial apparatus, or a flow of the relatively hot potable water along the second path to the industrial apparatus. The thermal transfer system provides an effluent flow path along which effluent released from the industrial apparatus first flows through the heat exchange device and travels from the heat exchange device into the drain line for flow into the grease trap. The effluent which travels from the heat exchange device into the drain line for flow into the grease trap is characterized by a second and relatively low effluent temperature. The effluent flow path, along which effluent released from the industrial apparatus travels from the heat exchange device into the grease trap, may extend into a sewer system coupled to receive non-solid components of the effluent.

The controller of the thermal transfer system may be a processor based system having memory and storage for operating the system in accord with an executable program that monitors and uses sensed data to determine when to provide flow along the second path based on availability of suitable effluent for thermal transfer in the heat exchange device. The executable program may monitor and use sensed data to determine when there is flow of effluent from the industrial appliance and to actively move the flow of effluent from the industrial appliance, e.g., with a pump, to the heat exchange device or to a holding tank for transfer of thermal energy to the relatively hot potable water along the second path. Also, the executable program may also monitor and use sensed data to determine water consumption and energy use by the industrial appliance.

A predetermined condition required by the thermal transfer system may be that the second flow of heated potable water or available effluent have a minimum temperature or that there is a minimum difference in temperature between water entering the heat exchange device and effluent entering the heat exchange device.

The controller in the thermal transfer system may operate a valve to send water heated by the heat exchange device to the appliance when the temperature of effluent passing between the holding tank and the heat exchange device exceeds a minimum value. The controller may also operate the valve to send water which passes through the first water heater to the appliance when the temperature of effluent passing between the holding tank and the heat exchange device does not exceed the minimum value. The minimum temperature value may be at least 140° F. (60° C.) or at least 130° F. (54° C.) or at least 120° F. (49° C.) or at least 110° F. (43° C.). When the temperature of effluent passing between the holding tank and the heat exchange device does not exceed the minimum value, the controller may operate a valve to discharge effluent from the holding tank or may operate a valve to direct a portion of the water which passes through the first water heater to a holding tank.

According to another series of embodiments there is provided an inventive method of operating a water consumptive industrial appliance for which there is provided a conventional configuration which can supply, on demand, a first flow of heated potable water with which the industrial apparatus performs processing. The conventional configuration discharges hot effluent, comprising the potable water used in the processing, into a drain. According to the method, a heat exchanging flow path provides heat transfer between a flow of discharged effluent and a flow of relatively cool potable water to elevate the temperature of the relatively cool potable water, this providing a second flow of heated potable water. Temperature data is acquired to determine whether such a second flow of water, after being elevated in temperature along the heat exchanging flow path, is suitable for use in the industrial appliance relative to a first flow of heated potable water. If it is determined that such a second flow of heated potable water is acceptable for use in the industrial appliance, in lieu of a first flow of heated potable water then, after creating the second flow of heated potable water, the second flow of heated potable water is sent from the heat exchanging flow path to a booster water heater to further elevate the temperature of the water. The second flow of heated potable water is sent from the booster water heater into the industrial apparatus to perform the processing. According to an embodiment of this method, the step of acquiring temperature data to determine whether such a second flow of heated potable water is acceptable for use in the industrial appliance is based on whether the discharged effluent has a minimum temperature relative to the temperature of the relatively cool potable water before entering the heat exchanging flow path. Also according to an embodiment of the method, determining whether such a second flow of heated potable water is acceptable for use in the industrial appliance is based on whether the discharged effluent has a minimum temperature. The minimum temperature may be at least 140° F. (60° C.) or at least 130° F. (54° C.) or at least 120° F. (49° C.) or at least 110° F. (43° C.). For such embodiments, requiring the temperature of effluent to exceed a minimum value may be a criterion for sending water heated by the heat exchange device to the appliance, such that when the temperature of effluent does not exceed the minimum value, the first flow of heated potable water is sent to the appliance.

There is also provided a method of increasing the capability of a grease trap to solidify grease from an industrial machine which performs processing with heated water and then discharges effluent comprising the heated water and the grease into a drain. The method includes providing a flow of the discharged, grease-containing effluent through a heat exchanging device to lower the temperature of the effluent. This provides a cooled effluent and may elevate the temperature of another liquid. The cooled effluent may flow into the drain to solidify the grease in a grease trap. In one embodiment, the heat exchanging device elevates the temperature of potable water for use in the industrial appliance. The processing performed by the industrial machine may be dishwashing. The method may include, before providing the flow of the discharged effluent through the heat exchanging device, filling a holding tank with the discharged effluent. The method may include circulating the discharged effluent between the holding tank and the heat exchanging device. Flow of the discharged, grease-containing effluent through the heat exchanging device may lower the temperature of the effluent to 110° F. (43° C.) or less without tempering the effluent with a relatively cool fluid.

BRIEF DESCRIPTION OF THE FIGURES

These and other features of the present invention will become better understood when the following detailed description is read with reference to the accompanying drawings in which like characters represent like parts throughout, where:

FIG. 5A illustrates overall the electronic and mechanical processes, from startup to shutdown;

FIG. 5B illustrates an exemplary startup sequence;

FIG. 5C illustrates an exemplary normal operation process;

FIG. 5D illustrates exemplary contingency operations; and

FIG. 5E illustrates the procedure for system shut down.

Figure 1:
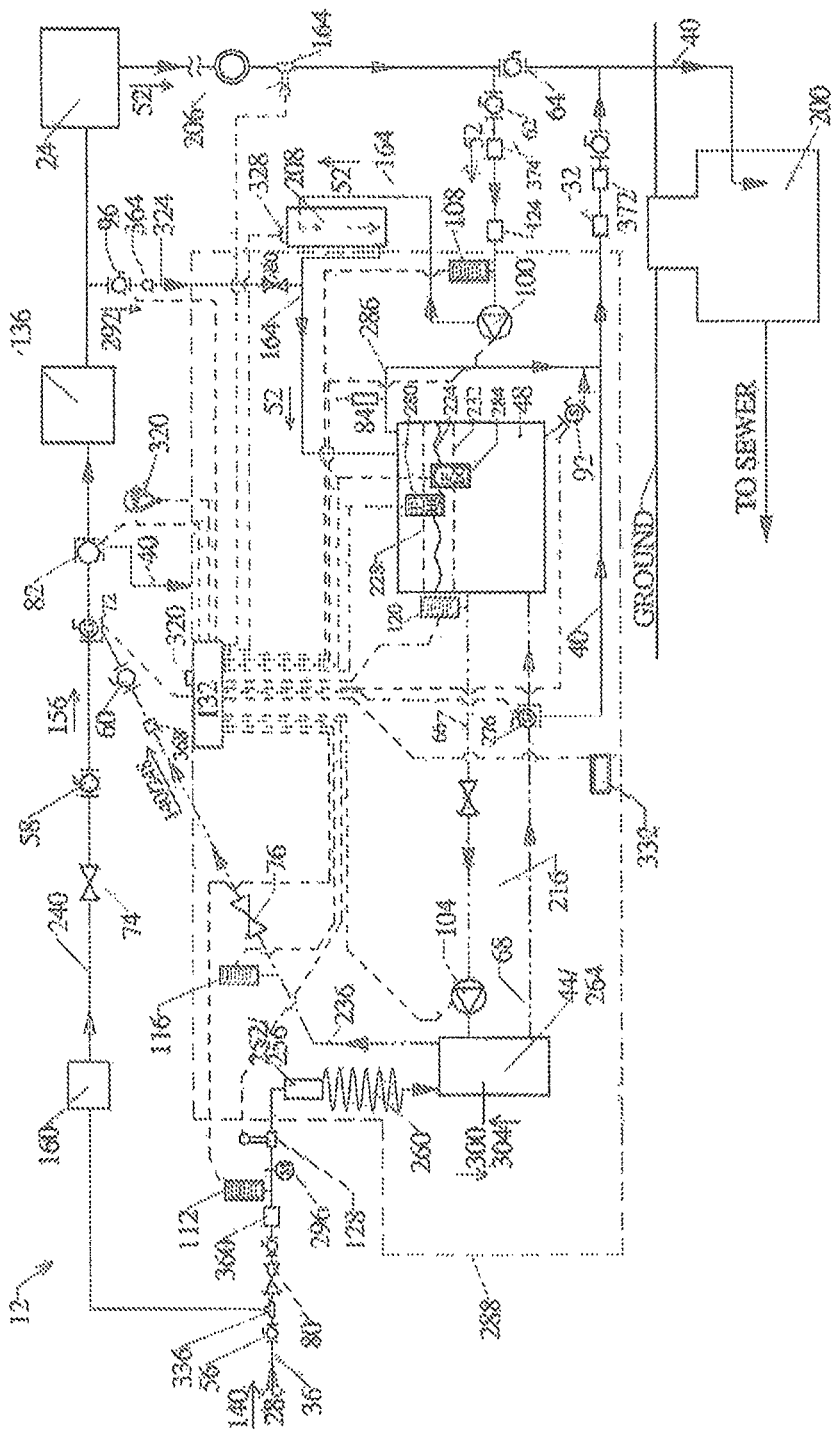
FIG. 1 illustrates, schematically, an installed energy recovery system according to the invention shown in relation to operation of a water consumptive appliance positioned between conventional supply and drain lines.

Like reference numbers are used throughout the figures to denote like components. Numerous components are illustrated schematically, it being understood that various details, connections and components of an apparent nature are not shown in order to emphasize feature of the invention. Various features shown in the figures are not shown to scale in order to emphasize features of the invention.

DETAILED DESCRIPTION OF THE INVENTION

Before describing in detail particular methods, components and features relating to the invention, it should be observed that the present invention resides primarily in a novel and non-obvious combination of elements and method steps. So as not to obscure the disclosure with details that will be readily apparent to those skilled in the art, certain conventional elements and steps have been presented with lesser detail, while the drawings and the specification describe in greater detail other elements and steps pertinent to understanding the invention. The following embodiments are not intended to define limits as to the structure or method of the invention, but only to provide exemplary constructions. The embodiments are permissive rather than mandatory and are illustrative rather than exhaustive. Also to facilitate understanding of methods, components and features, intended meanings of certain terms used to describe invention are explained.

Recovered heat means heat transferred from a first liquid medium to a second liquid medium through a heat exchange process where the first and second liquids are circulated along one another to effect heat exchange. Tempering means mixing a relatively hot liquid, such as water, with a cooler liquid to lower the temperature of the resulting liquid.

For configurations which include a water heater, also at times referred to as a first water heater, and a booster water heater, the booster water heater may be distinguished from the first water heater because the booster water heater functions to elevate potable water to a higher temperature than does the first water heater. Systems according to the invention may include boilers. When a system includes both a boiler and a booster water heater, the boiler may correspond to the first water heater, in which case the booster water heater is also distinguishable from the boiler because the booster water heater functions to elevate potable water to a higher temperature than does the boiler. In other embodiments a system may comprise a boiler which satisfies temperature elevation requirements which might otherwise be facilitated with the booster heater, and the system may not require two separate water devices which provide active heating of water.

Active heating of water means a process by which the water temperature is elevated through directed heating such as by application of heat in a water heater or boiler with a hydrocarbon fuel, electricity or solar energy. Active heating does not mean heating which occurs when water is warmed by transfer of thermal energy between a surface present in an ambient environment and the water, such as the warming which occurs when the temperature of water in a pipe comes into equilibrium with the ambient temperature of the surrounding environment. For a pipe that extends from a cold exterior environment into a warm interior environment, the temperature elevation of water in the pipe due solely to presence of the pipe in the warm interior environment (through thermal or radiant conduction) is not active heating of the water. Nor does active heating of water mean heating of water which occurs when water is warmed by transfer of thermal energy from a source (e.g., from a liquid such as water, oil or an effluent) in a heat exchange device.

Figure 2:
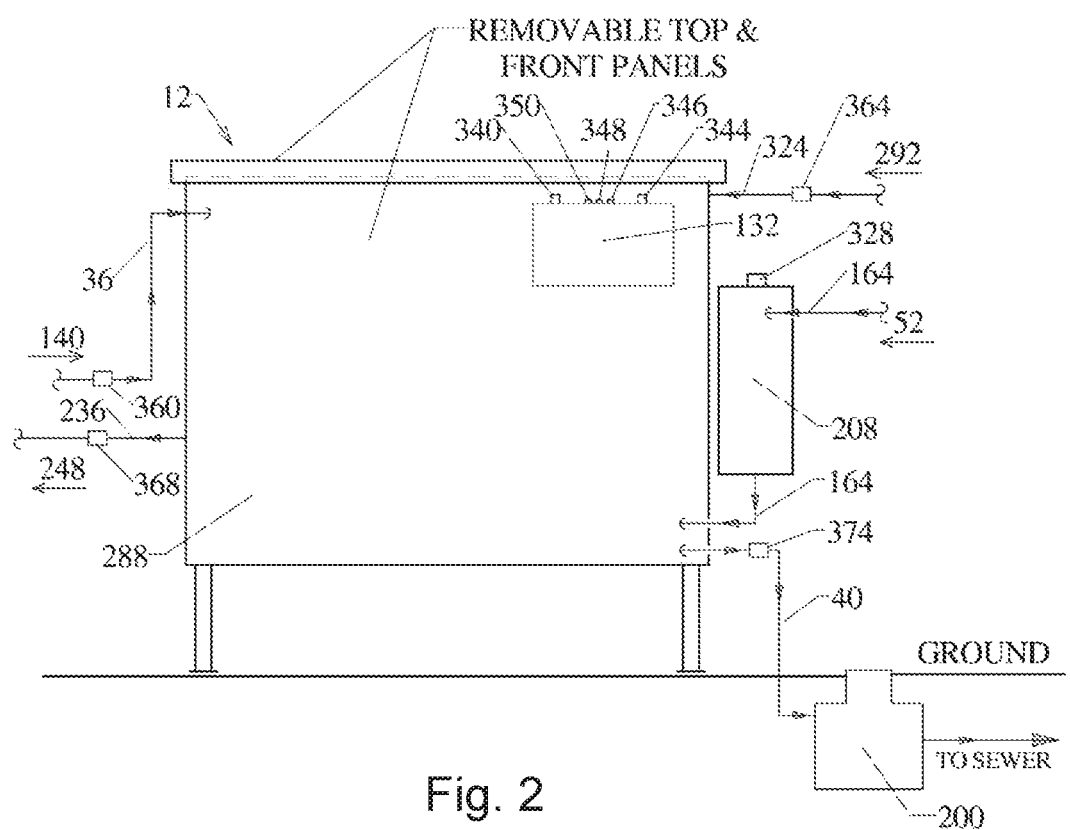
FIG. 2 is an exterior elevation view of the energy recovery system described in FIG. 1.
Figure 3:
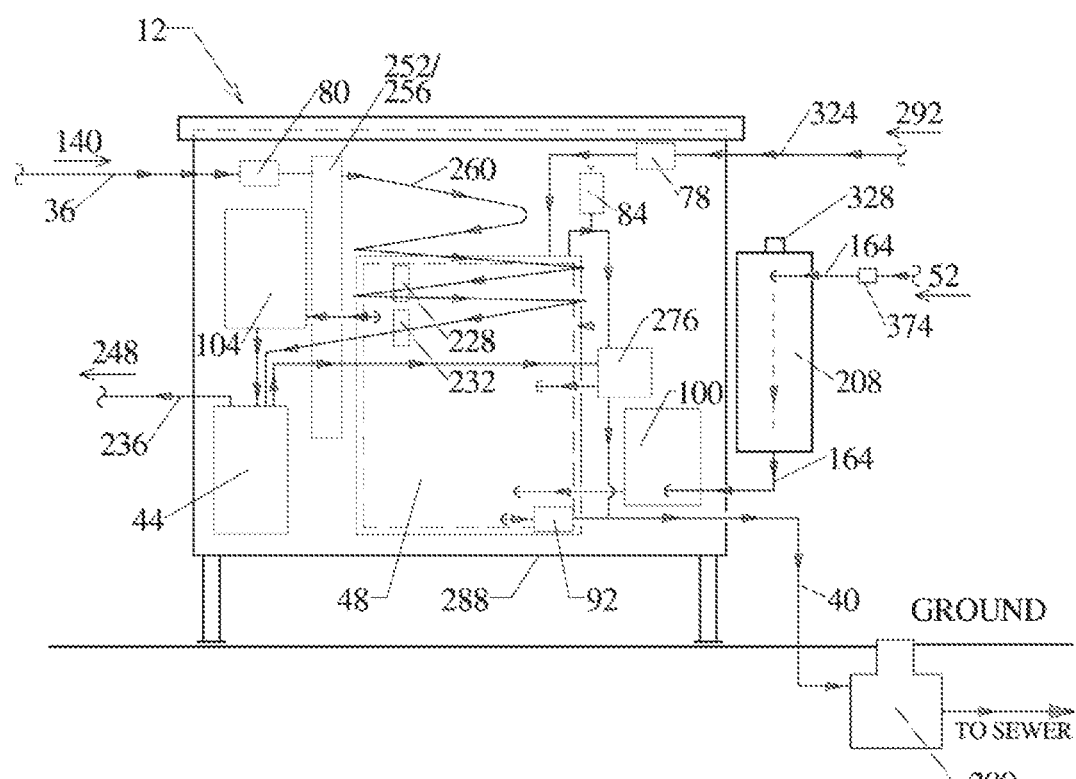
FIG. 3 is a partial cut-away view of the energy recovery system, schematically illustrating numerous interior components of the system.

With reference to FIGS. 1, 2 and 3, there is shown an energy recovery system 12 for reuse of thermal energy generated for an industrial application that consumes heated water. The energy recovery system 12 is also referred to as a thermal transfer system. Commercial suitability of the energy recovery system 12 is illustrated for operations of a dishwasher of the type commonly used in food service businesses, but may be used in many other contexts, including hot water laundry operations. References made to a dishwasher appliance are exemplary of numerous industrial applications, e.g., to commercial clothes washing machines, and other industrial processes which consume hot water in such quantities that energy recovery is economically desirable. By way of further example, the concepts disclosed also enable heat recovery in systems which exchange heat between fluids such as, for example, pasteurization processes.

The energy recovery system 12 is configured for optional operation with the industrial appliance, as well as ease of effecting connections 28, 32 into, or disconnections from, respectively, water line 36 and a drain line 40 normally leading from the dishwasher 24 to a grease trap 200. Quick disconnect interfaces further include water quick disconnect connectors 360, 364, 368, and effluent quick disconnect connector 372; these four flow line disconnects in addition to the power disconnect effect rapid removal of the recovery system 12 to resume conventional operation without the ability to provide energy (i.e., heat) recovery. Major components of the recovery system 12 include a sanitary double walled heat exchange module 44, a hot water holding tank 48 which receives and holds hot dishwasher effluent 52 before entering the heat exchange module 44, multiple normally-open (NO) manual valves (including water supply intake manual cutoff valve 56, hot water supply line (HWSL) manual cutoff valve 58, heat exchange output manual cutoff valve 60, and effluent drain manual cutoff valve 62), solenoid-actuated valves 64, 72, 82, 92, 96, air vent 84, pumps 100, 104, temperature sensors 108, 112, 116, 120, flow sensors 124, 128, and a controller 132.

The controller 132 monitors temperature and flow sensors and meters and operates valve actuators and pumps to effect heat transfer between hot dishwasher effluent and relatively cool potable water 140 received from a municipal supply. The heat transfer, effected with the heat exchange module 44, elevates the temperature of the incoming potable water 140 before subjecting the water to further heating with a conventional process using a booster water heater 136. The heat exchanger 44 is of the double wall type to assure energy transfer with code compliant isolation of potentially contaminating effluent 52 from the incoming sanitary potable water 140. This can maximize thermal transfer between hot effluent exiting an appliance, with a fresh supply of relatively cold potable water 140 in feed line 36 being converted to heated potable water 248 in feed line 236. The heat exchange module 44 operates in conjunction with a reserve of hot dishwasher effluent 52 collected in the holding tank 48 to assure sufficient supply to meet demands for operation of the heat exchange module. The system includes sensors to monitor whether the effluent reserve is of sufficient quantity and temperature to make worthwhile use of the heat exchange process. Based on sensor values the controller adjusts pumps and valves of the recovery system to proceed with operation or to accommodate varied conditions which could otherwise adversely affect performance of the appliance. For example, when the temperature of effluent 52 in the holding tank 48 is too low, the controller 132 can automatically shift from use of the cold water supply 140 (in combination with the heat exchange device 44) to use of an alternate supply of hot water 156, e.g., from a hot water heater 160, to feed the booster heater 136. The energy recovery system 12 can also divert water from the booster heater 136 to quickly fill the holding tank 44 in order to prime or operate the heat exchange module 44.

Figure 4:
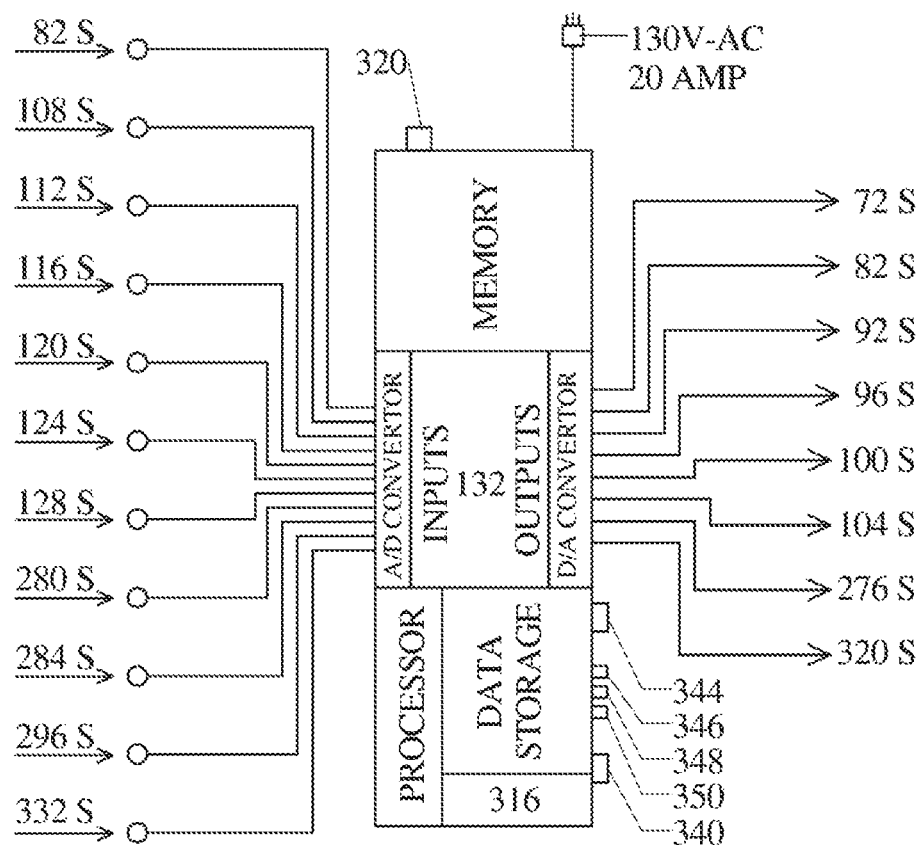
FIG. 4 illustrates input sensor signals and output control signals associated with a controller which operates the energy recovery system.

With reference to FIG. 4, the controller 132 receives signals from the temperature sensors 108, 112, 116, 120 and flow sensors 124, 128, and provides control signals to operate NC drain bypass valve 64, 3-way gate valve 72, purge drain valve 82, drain valve 92, holding tank fill valve 96, and first and second effluent pumps 100, 104. The controller 132 is a microcomputer, having a processor, memory and storage. The controller runs a program that modifies valve settings to change flow paths of potable water 140 and waste water effluent 52 into and out of the dishwasher 24, to perform heat recovery activities subject to acceptable dishwasher operation. A feature of the system 12 is selective operation to recover thermal energy from the effluent, responsive to varied operating conditions. When the temperature of the effluent 52 in the heat exchange module 44 and holding tank 48 is too low to provide satisfactory heat transfer to the potable water 140, the recovery system may be bypassed, and a pre-heating function may be initiated to quickly fill the holding tank 48 with hot water. For example, on start-up of the dishwasher 24, the booster water heater 136 may be fed heated potable water 156 from a hot water heater 160 (external to the recovery system 12) while the relatively cold effluent 52 is purged from the holding tank 48 through the drain valve 92 or the three way valve 276 and sent into the drain line 40. The holding tank 48 is filled with heated potable water 292 from the booster heater 136 (e.g., during cold start-up) until the holding tank 44 receives sufficient hot potable water 156 to effect the heat transfer operation. Once the dishwasher 24 is discharging hot effluent 52 the effluent travels through the recovery line 164 to continue supplying the holding tank with relatively hot water while the valve 276 in the return line 68 of the circulation loop 216 may allow relatively cool effluent exiting the heat exchange module 44 to flow to the drain line 40.

During operation of the recovery system 12, relatively hot effluent 52 exiting the dishwasher 24 initially travels through a segment of the open drain line 40 and is then routed through a thermal recovery line 164, which includes a filtration stage 208, and then enters the holding tank 48. The hot effluent 52 circulates between the holding tank 48 and the heat exchange module 44. Effluent 52 travels from the holding tank 48 to the heat exchange module 44 through a send line 66 and is passed back to the holding tank 48 via a return line 68. The return line 68 includes a three way valve 276 for rapid removal of effluent cycling through the heat exchange module 44. Effluent received into the heat exchange module travels through a first isolated channel 172 (not shown) within the heat exchange module 44 in a first direction of circulation 176 (not shown) before returning to the holding tank 48. At the same time, the relatively cold potable water 140 passes through a second isolated channel 180 (not shown) within the heat exchange module 44 in a second direction of circulation 184 (not shown) opposite the first direction of circulation. With the second channel 180 separated from the first channel 176 by a double wall, circulation of the two fluids in opposite directions facilitates transfer of heat from the hot effluent 52 to the potable water 140. The controller 132 receives signals 124s from flow sensor 124, positioned in the drain line 40, indicating occurrence of gravity flow movement by the effluent 52.

When effluent 52 movement is detected by the flow sensor 124 and communicated to the controller through signal 124s, the controller 132 sends a command through a first signal 64s to the bypass valve 64 to divert flow of effluent 52 from the open drain line 40 (otherwise leading directly into the grease trap 200) into the thermal recovery line 164. The controller 132 also sends a second signal 100s to initiate operation of the pump 100. This moves the hot effluent 52 through the thermal recovery line 164 and into the holding tank 48. In other embodiments, movement of waste water effluent 52 into the holding tank 48 may be entirely gravity fed. The diverted effluent 52 first passes through the filtration stage 208 before entering the holding tank 48. After entering the holding tank 48, and when there is a demand to send hot potable water to the dishwasher 24, the controller sends a third signal 104s to initiate operation of the second pump 104 and a fourth signal 72s to 3-way gate valve 72 to connect flow of water from the module 44 to the booster water heater 136 via a feed line 236. This causes heat transfer from the effluent 52 to the relatively cold potable water 140 received from the water line 36 as the second pump 104 actively circulates effluent through the heat exchange module 44 and back to the holding tank 48 while potable water 140 passes through the module 44 and enters the feed line 236 as heated potable water 248 for input to the booster water heater 136. Before sending the heated potable water 248 into the booster water heater 136, the controller 132 diverts any residual relatively cold water present in the hot water supply line 248 via the purge drain valve 82, to drain line 40, until fully heated water, e.g., at a temperature of 140° F. (60° C.), is available for delivery into the booster water heater 136. Depending on whether the temperature and quantity of the effluent 52 in the holding tank 48 is sufficient the controller 132 directs positioning of the three way gate valve 72 to select movement of either (i) heated potable water 140/248 from the heat exchanger 44 through a feed line 236 to the booster water heater 136, or (ii) heated water 156 from a conventional hot water supply line 240 to the booster water heater 136.

The filtration stage 208 in the recovery line 164 comprises one or more strainers 214 (not shown) and a filter bag 210 (not shown) in series with one another to remove coarse and fine debris from the waste water effluent 52 before the effluent is received into the holding tank 48, so as not to clog the heat exchange module 44.

Before sending the heated potable water 156 to the booster water heater 136, the controller 132 diverts any residual relatively cold water present in the hot water supply line 240 via the purge drain valve 82, to drain line 40, until fully heated water, e.g., at a temperature of 140° F. (60° C.), is available for delivery into the booster water heater 136. The controller may be programmed to temporarily switch from supplying the booster heater with water from the feed line 236 to supplying hot water from the supply line 240 when residual relatively cold waste water is present in the holding tank 48 or the loop 216, or when little or no effluent 52 is present in the holding tank 48. By selectively feeding the pre-heated domestic potable hot water 156 into the booster water heater 136, incoming water to the dishwasher 24 can be quickly brought up to the required temperature when the holding tank 48 does not have a suitable supply of effluent. In embodiments of the recovery system 12, the controller 132 may modulate output from the three-way valve 72 to permit a gradual introduction of warmed water from the feed line 236 for blending with domestic potable hot water 156 coming in on the hot water supply line 240.

The recovery system 12 as illustrated in FIG. 3 pre-treats the domestic water 140 in the water line 36 by flowing it through a phosphate dispenser 252 of slowly dissolving hexametaphosphate crystals 256 in order to reduce scaling along metal surfaces, including both sides of the sanitary double wall heat exchange module 44, coiled copper piping 260, the booster water heater 136, and the dishwasher 24. Surfaces benefitting from this pre-treatment may include all heat transfer surfaces along the path of water flow.

Instead of dumping to drain line 40 relatively high temperature effluent 52 upon exit from an appliance, e.g., dishwasher 24, effluent 52, at nearly the fully heated operating temperature of water in a rinse cycle, flows into the recovery system 12 to effect transfer of thermal energy to the relatively cold potable water 140. This substantially reduces the overhead cost of elevating the potable water temperature through conventional heating. Only after the recovery system 12 removes considerable heat energy from the waste water effluent 52, does the controller 132 pass the effluent 52 into the open drain line 40, e.g., at a temperature close to the ambient temperature. By maximizing transfer of heat from the hot waste water effluent 52, the need for conventionally heated heating potable water 156 (i.e., heated with a conventional energy consumptive water heater) is significantly reduced or eliminated. The resulting reduction in waste water temperature after processing through the heat exchange module 44 also satisfies any continuous need for water tempering at the discharge point, such as required in many municipalities to reduce the temperature of effluent prior to flow into sewer grease traps. Thus, without requiring a separate cooling stage, there is an elimination or reduction of cold grease problems resulting from constant discharge of hot waste water with much less consumption of cold potable water to temper the hot water. Heat which would otherwise raise the temperature of materials deposited in the grease trap 200 above that required for grease to cool and congeal, is extracted from the dishwasher effluent 52 and recycled before the effluent reaches the grease trap 200.

Systems according to embodiments of the invention may also include a manual ball-type bypass gate valve (not shown) for each of the incoming water lines 36 and 240 to allow bypass of the recovery system 12 and restoration of original plumbing layouts for use with conventional domestic hot water heating. This allows for continued use of the dishwasher 24 should the recovery system 12 go into an alarm mode or an unanticipated shutdown sequence. Flow lines for the water sources may also include quick disconnect connectors 360, 364, 368, and 372 to enable rapid substitution or removal of the recovery system 12. Use of double backflow preventer check valves 74, 76, 78, and 80 on all domestic water connections prevents backflow to sources of domestic water at connection points. Disclosed embodiments of the recovery system 12 do not require pressurization of waste water but, rather, are based on gravity feed, utilizing pumps 100, 104, safety overflow drains 286 and relief valves (auto air vents) 84 which operate based on sensing a negative or positive pressure to prevent build-up of water pressure.

Flow of potable water 140 into the dishwasher 24 need not be controlled or restricted by the recovery system 12 as this is governed by domestic water supply water pressure. Variations in domestic water pressure may remain subject to overall water demands by the dishwasher 24 as well as typical fluctuations due to unrelated water consumption. The flow of potable water 140 into the heat exchange module 44 is sensed with the flow sensor 128 which sends signal 128s to the controller 132, which in turn activates the pump 104, and which may open the effluent solenoid gate valve 276 if the holding tank contains too much water (as sensed by a first float level sensor FHI 280 in holding tank 48 and signaled to controller 132 through signal 280s) to divert dishwasher waste water effluent 52, otherwise circulating in the loop 216 between the heat exchange module and the holding tank 48, into the common waste line 40. In other designs, the effluent solenoid gate valve 276 may be coupled between the holding tank 48 and the drain line 40, or between the heat exchange module 44 and the drain line 40. The effluent solenoid gate valve 276 is operated based on positions of float level sensors FHI 280, FLO 284 positioned in the holding tank 48 to maintain no more than a predetermined maximum level 228, and no less than predetermined minimum level 232, respectively, of effluent 52 in the holding tank 48. However, the controller 132 may be programmed to completely drain the holding tank 48 upon deactivation of the recovery system 12, by opening solenoid valve 92 and momentarily continuing operation of the pump 104 to drain hot dishwasher effluent 52 from the heat exchange module 44 into the holding tank 48 and drain contents of the holding tank 48 into the drain line 40.

After the potable water 140 passes through the optional hexametaphosphate crystal dispenser 252, the heat exchange module 44, and the dishwasher 24, the potable water flow 140 continues through coiled copper piping 260 surrounding the holding tank 48 to maximize extraction of heat which would otherwise be lost through insulated walls encasing components of the recovery system 12. The flow continues through the heat exchange module 44, in a flow direction opposite the direction of flow of the hot dishwasher effluent 52. After exiting the heat exchange module 44, the heated potable water 248 is sent, under normal municipal water street pressure, into the booster water heater 136 and on to the dishwasher 24.

The recovery system 12 includes a flow meter 296, which provides data to the controller 132 for monitoring the flow rate of potable water 140 which enters the recovery system 12. The recovery system 12 also includes flow sensors 124 and 128. Flow sensor 124 monitors movement of drain water 52 from the appliance, e.g., the dishwasher 24. Flow Sensor 128 monitors the flow of domestic cold water (DCW) 140 through water line 36 into the recovery system 12. Temperature sensors, e.g., 108, 112, 116 and 120 are distributed about the water lines to provide, respectively, temperature data signals 108s, 112s, 116s and 120s, to the Controller 132. The temperature sensors 112 and 120 are positioned near the points of ingress to the heat exchange module 44. Specifically, sensor 112 is positioned to measure the temperature of potable water 140 prior to entry into the module 44, and sensor 120 is positioned to measure the temperature of effluent 52 prior to entry into the module 44. The temperature sensor 116 is positioned near the exit from the heat exchange module 44 to measure the temperature of warned potable water 248 travelling through the feed line 236 from the heat exchange module 44. The controller 132 also monitors the temperature of the effluent 52 exiting the dishwasher 24 prior to entering the holding tank 48 with the temperature sensor 108. With the pump 104 circulating the dishwasher effluent 52 in the closed loop 216, the controller 132 uses the sensor signal 120s to determine whether the temperature of effluent 52 circulating in the loop 216 is above a minimum value for acceptable heat exchange. If the temperature of effluent 52 circulating in the loop 216 is below the minimum value, the controller 132 sends signals 92s and 96s to, respectively, (i) open the drain valve 92 and remove the relatively cold dishwasher effluent 52 and (ii) open the fill valve 96 to send hot water 244 through fill line 324 from the booster heater 136 to fill the holding tank 48 as or after the colder dishwasher effluent 52 drains from the holding tank 48 to drain line 40.

The recovery system also includes insulated walls 288 encasing components of the Recovery System 12 and a pressure sensor 328 on filtration stage 208. The system may also include a two output T coupling 336 having a controllable output valve to control flow to the system 12.

Electronic and mechanical processes for startup, operation and shutdown of the recovery system 12 for the illustrated dishwasher 24 are described in the flow charts of FIG. 5. The heat exchange module 44 comprises an effluent channel 172 and a potable water channel 180 separated from one another by heat transfer dividing plates 264 (not shown) filled with air. Dishwasher effluent 52 placed in the holding tank 48 flows into and through the effluent channel 172 via the pump 104 as directed by the controller 132. Fluid levels in the holding tank 48 are sensed and maintained within a defined range with the pair of float level sensors, $F_{HI}$ 280, $F_{LO}$ 284, which provide holding tank fluid level data signals 280s, 284s to the controller 132. The controller 132 sends "gate valve open" and "gate valve close" signals to control the positions of valves which perform fill and drain functions for the holding tank 48. For example, the "gate valve open" signal is sent to the valve 92 when the holding tank effluent level as measured by the first float level sensor $F_{HI}$ 280 exceeds a predetermined maximum HI level 228. The controller 132 sends the "gate valve close" signal to the valve 92 and sends the "gate valve open" signal to the valve 96 or to the valve 276 when the effluent level as measured by the second float level sensor $F_{LO}$ 284 is less than a predetermined minimum LO level 232. With the float level sensors 280, 284 sending signals 280s and 284s respectively to the controller 132, appropriate control signals 92s, 96s or 276s, are sent from the controller to one or more of the gate valves 92, 96 or 276 to maintain the effluent level in the holding tank 48 within the predetermined level range. When the recovery system 12 is initially operated and the water level in the holding tank 48 is below the minimum level, the controller 132 initially sets the system valves including system gate valves 72, 276 and implements sequential processes which include signals to pumps and valves, as shown in the flow charts of FIG. 5. The controller adjusts positions of the valves 72, 276 with signals 72s, 276s, respectively. During operation of the recovery system 12 the controller 132 continually monitors temperature and fluid levels and operates the array of valves to assure heat recovery and utilization without interrupting or impeding normal operation of the dishwasher 24.

If the second float level sensor $F_{LO}$ 284 sends a signal 284s to the controller 132 indicating the effluent level 224 is below a predetermined LO water level 232 for a predetermined period (e.g., less than a minute or up to a few minutes), the controller 132 initiates a "top-off" function by setting the valve 96 in an open position, so that a portion 244 (not shown) of the hot potable water 292 from the booster heater 136 is allowed to flow through the valve 96 to the holding tank 48 until the water level 224 in the holding tank 48 reaches the minimum LO level 232 and the second float level sensor $F_{LO}$ 284 ceases sending of the "LO" signal to the controller 132. When the controller 132 no longer receives the "LO" signal, it closes the valve 96. This holding tank 48 fill process is repeated when daily operation of the dishwasher 24 is initiated. If the water level in the holding tank 48 is above the predetermined maximum HI level 228, the first float level sensor $F_{HI}$ 280 continuously sends a "gate valve open" signal 280s to the controller 132 the signal 92s which controls the valve 92, in turn, sets the valve to an open position to lower the effluent level 224 until the level 224 in the holding tank 48 drops below the maximum HI level 228. When it is desired to drain effluent from the recovery system 12 (e.g., when a signal 120s from the sensor 120 indicates the effluent temperature in the loop 216 is below a minimum value) the controller signal 276s to the waste solenoid gate valve 276 opens the valve to remove water directly from the loop 216. Once the criteria (e.g., minimum temperature) are met, the, the controller signal 276s closes the valve 276.

In some embodiments, operation of the recovery system 12 may be powered on and off with the main power switch 138 of the dishwasher 24 shown in FIG. 1 while the controller 132 remains powered up; or power to the recovery system 12 may be separately switched. The controller 132 may be programmed so that, upon powering down the recovery system 12 to an "OFF" state, the controller 132 performs a series of steps which include opening the waste solenoid gate valve 276 to partly or completely drain the holding tank 48. Draining may cease based on a signal generated with a third float sensor (not shown) placed in the holding tank which provides a signal indicating when the effluent water level has diminished below a predefined level. Upon receipt of this sensor signal the controller signal 276s is set to close the waste solenoid gate valve 276. The controller also terminates all functions of the recovery system 12 and operates an internal switch to fully turn off all power to the system.

The controller 132 according to the disclosed embodiment is a microcomputer comprising a programmable processor, memory and storage which includes an executable system operating and performance monitoring program 316 that runs on the microcomputer. The system operating and performance monitoring program 316 monitors and stores sensed data and uses this information to determine water consumption and energy use by the dishwasher 24. Computations of energy usage and savings may be based in part on temperatures of (i) incoming potable water 140, (ii) pre-heated potable water 156, (iii) effluent 52 exiting the dishwasher 24 and (iv) effluent 52 entering the waste solenoid gate valve 276. The system operating and performance monitoring program 316 calculates actual BTU savings based on, for example, average temperatures of water coming out of the booster heater 136, average temperatures of potable water 140 received from the domestic cold water line 36 measured by sensor 112, and the flow rates measured by the flow meter 296 and provided to the controller 132 as signals 296s.

All of the foregoing can be continually updated and shown on a display driven by the microcomputer or may be provided via a network link to a processor based device such as a notebook computer to enable remote monitoring and management of system performance. The system operating and performance monitoring program 316 also converts computations of data from energy saved to energy cost savings, based on current cost of power for the energy source used to heat water in the dishwasher 24. The computations may be performed with a processor in the recovery system 12 or the data may be uploaded to a hand-held device or personal computer.

Summary of Exemplary System Operation

The charts of FIG. 5 illustrate electronic and mechanical processes during operation of the energy recovery system 12 for the exemplary industrial dishwasher 24 during start-up, normal operations, contingent operations, and system shut down.

Figure 5A:
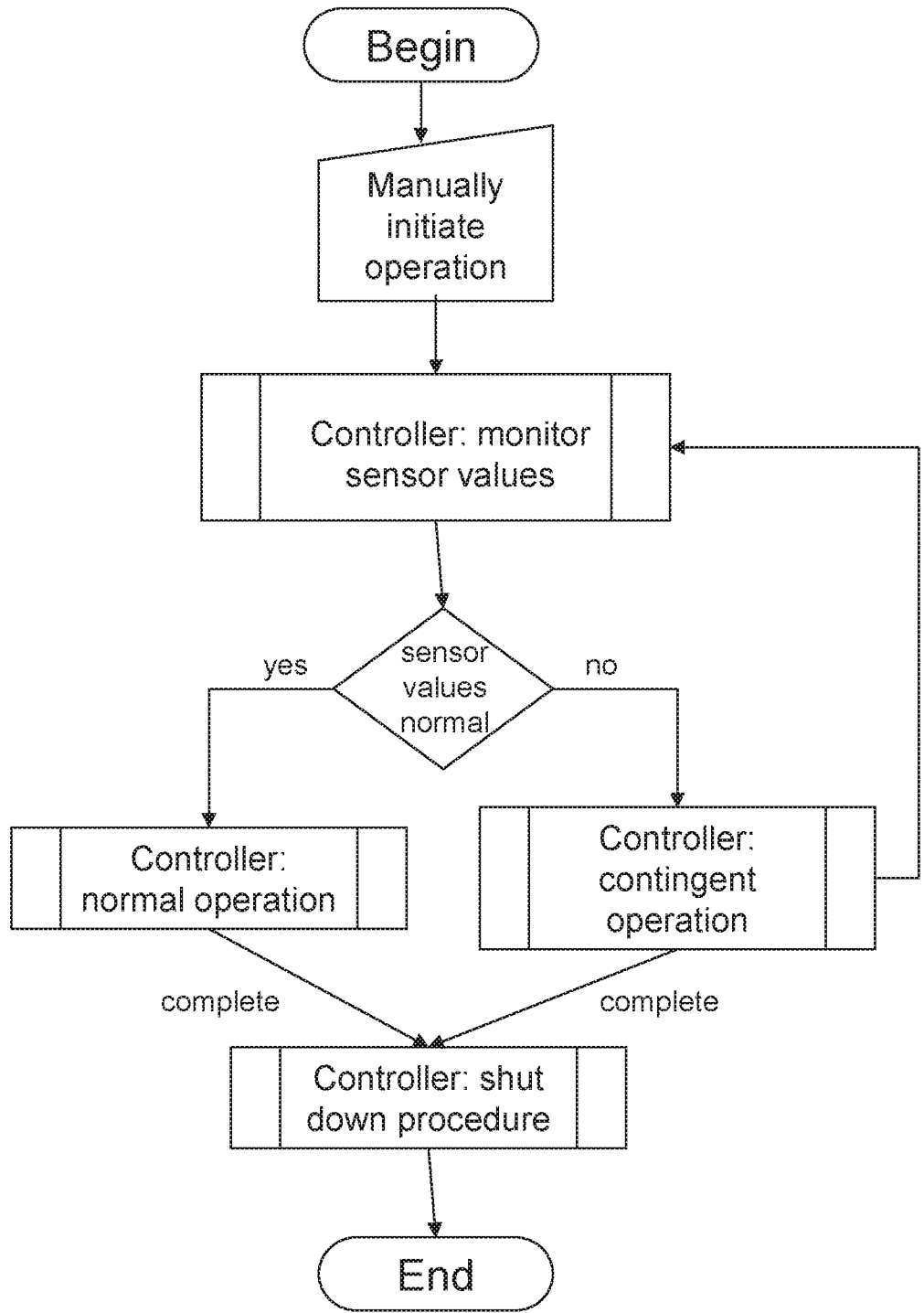
FIGS. 5A through 5E illustrate in flowchart format electronic and mechanical processes during operation of the energy recovery system for an exemplary industrial dishwasher where

FIG. 5A provides an overview of electronic and mechanical processes for the energy recovery system 12, from startup and initial system diagnostics to shutdown. Operation of the energy recovery system 12 is initiated manually by on/off switch 340, upon which the controller 132 monitors sensor signal values for initial values and performs system diagnostics to evaluate system state of health (SOH). If satisfactory SOH is confirmed, the controller 132 initiates normal operation which may include replacing cold effluent 52 in the holding tank with hot potable water 156. If unsatisfactory SOH is found and system diagnostics indicate a problem, the controller 132 initiates an alarm 352 (not shown), and yellow light 348 or red light 346 (depending on severity), and the energy recovery system 12 shuts down. If sensor initial values are not within normal range, the controller 132 initiates contingent operations; when contingent operations are complete, the controller 132 continues to monitor the sensor values during normal operation until the controller 132 initiates the shut-down procedure.

Figure 5B:
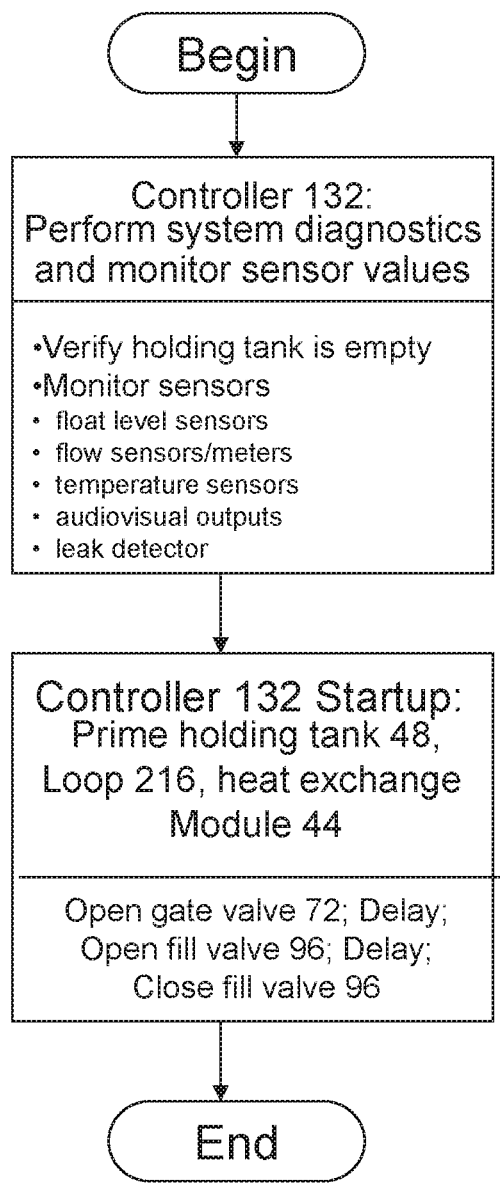

FIG. 5B illustrates an exemplary startup sequence. Operation of the energy recovery system 12 is initiated manually (shown in FIG. 5A), upon which the controller performs system diagnostics and monitors sensor values including float level sensors 280, 284; flow sensors/meters 124, 128, 296; temperature sensors 108, 112, 116, 120; audiovisual outputs 320 including and red light 346, yellow light 348, green light 350, and alarm 352; and leak detector 332, for initial values. For example, SOH diagnostics include verifying that the hot water holding tank 48 was emptied at the time the system was last shut down. If SOH diagnostics and sensor initial values are within normal ranges, the controller displays a green light 350 or other audiovisual output 320, opens 3-way gate valve 72 to send heated potable water 156 from the water heater 160 to the booster water heater 136; and after a predetermined delay, opens holding tank fill valve 96 to allow flow of hot (e.g., 180° F., 82° C.) water 292 from the booster heater 136 into the hot water holding tank 48. Once first float level sensor $F_{HI}$ 280 reaches a predetermined HI water level 228, the hot water holding tank 48 has adequate water to operate, and the controller 132 closes holding tank fill valve 96. The controller 132 operates the second effluent pump 104 briefly to expel air; to prime loop 216, i.e. through send line 66 and back through return line 68 to hot water holding tank 48; and to prime heat exchange module 44. At the conclusion of the startup sequence, the energy recovery system 12 is ready to accept hot effluent 52 from dishwasher 24, as in normal operations.

Figure 5C:
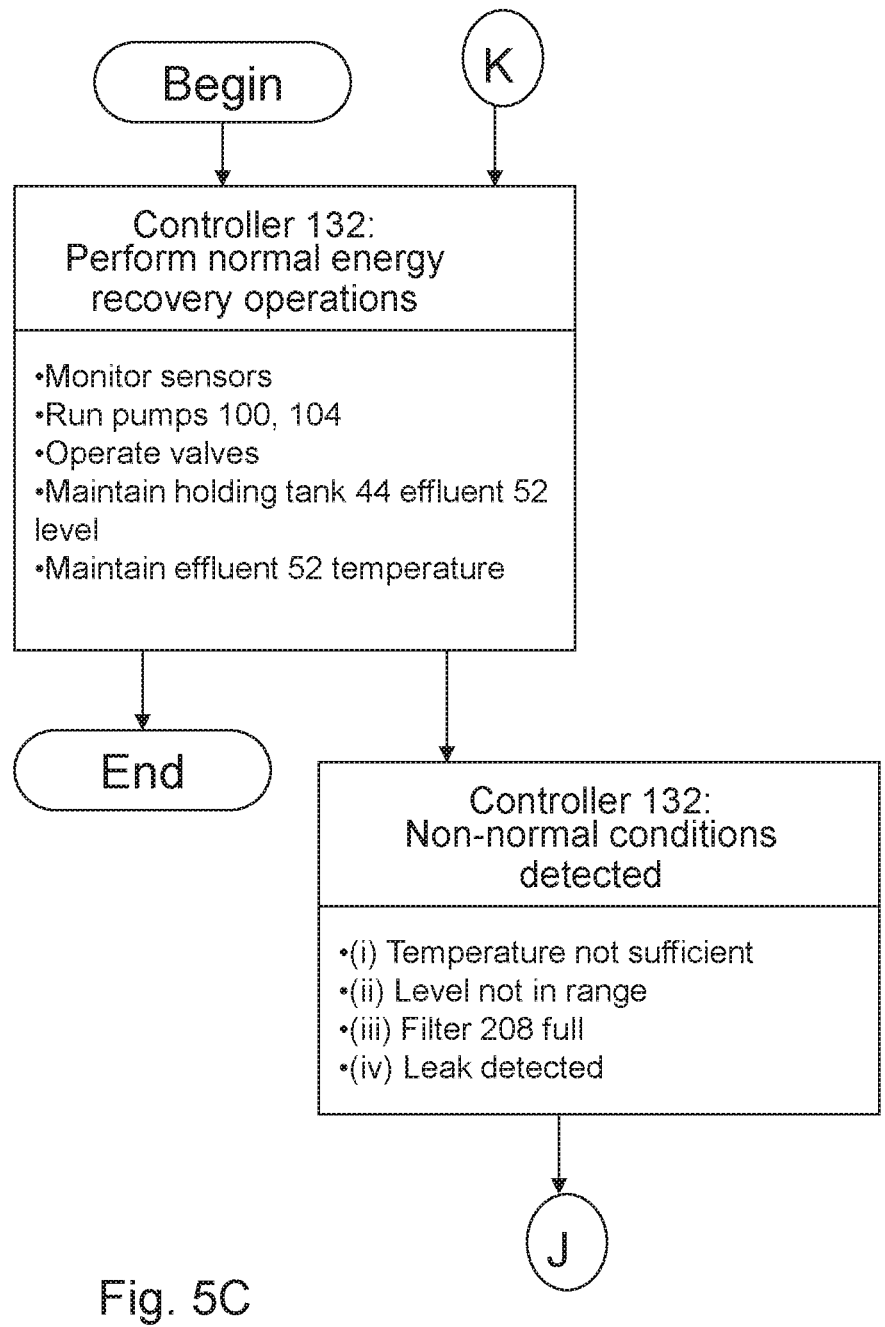

FIG. 5C illustrates an exemplary normal process for operation of the energy recovery system 12. With the controller 132 monitoring the flow sensor 124 positioned in drain line 40, when the dishwasher 24 expels hot effluent 52 into drain line 40, the controller sends a signal 100s to initiate operation of the first effluent pump 100 to transfer effluent water 52 through filtration stage 208 and into the hot water holding tank 48. The controller continuously monitors the flow of domestic cold water 140 using flow sensor 128 and flow meter 296. The controller runs the second effluent pump 104 to circulate effluent 52 through the heat exchange module 44 while flow sensor 128 indicates sufficient flow of domestic cold water (DCW) 140.

Once first float level sensor $F_{HI}$, 280 senses that the level of hot dishwasher effluent 52 in hot water holding tank 48 exceeds a predetermined HI water level 228, the hot water holding tank 48 has adequate hot dishwasher effluent 52 to operate. Next, the controller 132 turns off the first effluent pump 100, and opens drain valve 92 to dump water circulated by the second effluent pump 104 in closed loop 216 to drain line 40 until first float level sensor $F_{HI}$, 280 senses that the level of hot dishwasher effluent 52 in hot water holding tank 48 drops below the predetermined HI water level 228.

Controller 132 operates drain valve 92, holding tank fill valve 96, powered 3-way gate valve 72, purge drain valve 82, pumps 100, 102, and audiovisual outputs 320 including yellow light 348, green light 350, and alarm 352, based in part on temperatures as reported by temperature sensors 108, 112, 116, 120. Temperature sensor 108 measures the temperature T1 of waste water effluent 52 exiting the dishwasher 24; temperature sensor 112 measures the incoming ambient temperature T2 of potable water 140 prior to entry into the heat exchange module 44; temperature sensor 116 measures the temperature T3 of heated potable water 248 in feed line 236, exiting heat exchange module 44; temperature sensor 120 measures the temperature T4 of filtered effluent 52 in loop 216. Exemplary rules for controller 132 include (i) if T1−T2<MIN (a minimum temperature difference) and first float level sensor $F_{HI}$280 is below predetermined HI water level 228, then open holding tank fill valve 96 to fill hot water holding tank 48 with hot water; (ii) if T1−T2<MIN and first float level sensor $F_{HI}$280 is above predetermined HI water level 228, then open drain valve 92 momentarily, before continuing with rule (i); (iii) operate valves including powered 3-way gate valve 72, purge drain valve 82, and drain valve 92, to deliver hot water from water heater 160 to booster heater 136 and dishwasher 24; (iv) if T4<T1 (by predetermined temperature delta) then the controller 132 opens holding tank fill valve 96 to add water to hot water holding tank 48. (v) if the water in the loop 216 is too cool (e.g., above a predetermined temperature), the controller opens the waste solenoid gate valve 276 to drain filtered effluent 52 to drain line 40; controller 132 monitors T3 (via temperature sensor 116) for sufficient temperature and flow sensor 124 for active flow, then closes waste solenoid gate valve 276 and turns on second effluent pump 104.

Figure 5D:
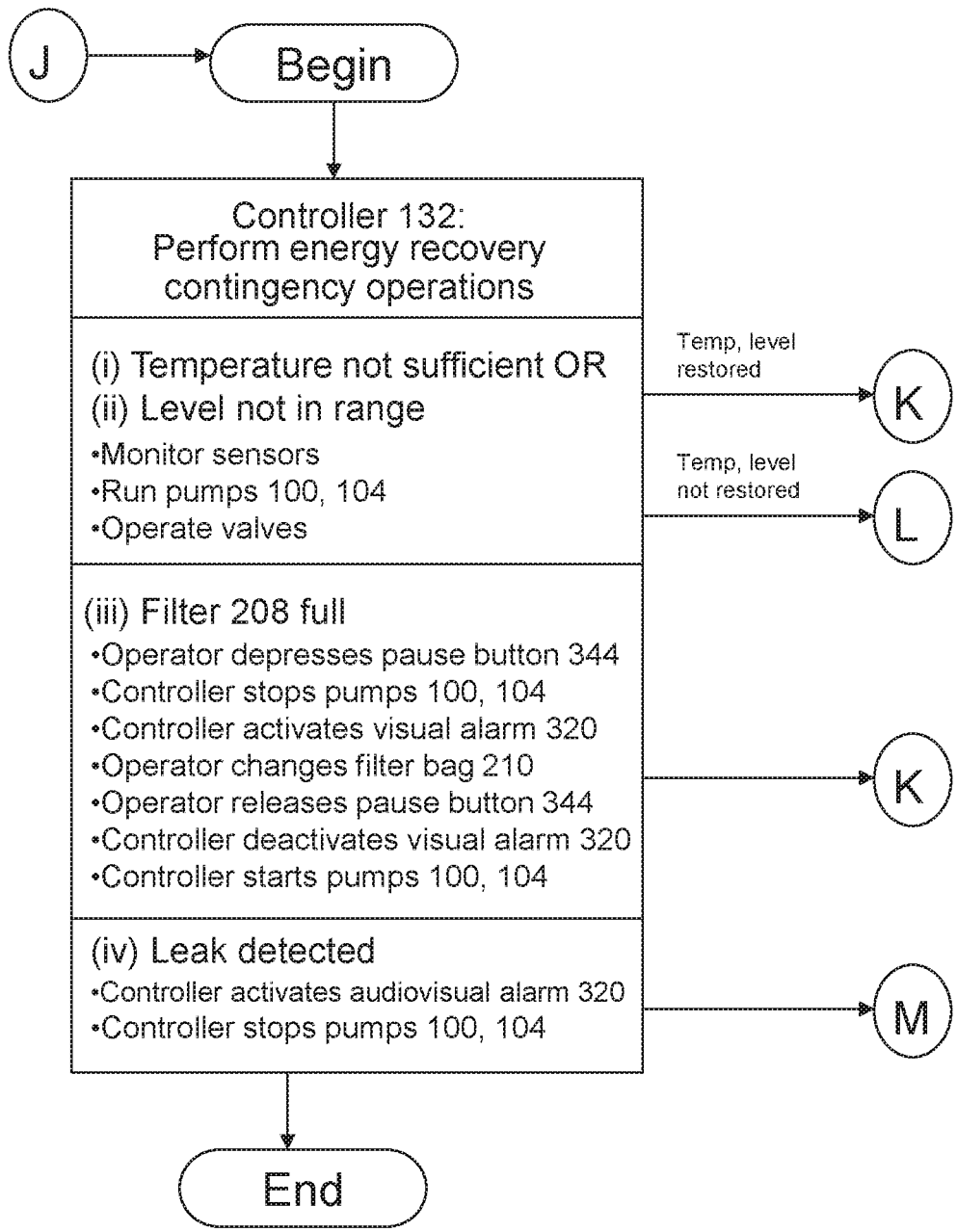

FIG. 5D illustrates exemplary contingency operations. Contingent operation of the recovery system 12 interrupts the flow of heated water 248 from the heat exchange module 44 which typifies the normal operation of the recovery system 12. Exemplary contingent operation rules for controller 132 include: (i) After sensor 124 indicates no effluent is flowing for a predetermined period, the controller 132 will start repeated cycling of second effluent pump 104 periodically and measure T4 using temperature sensor 120. If T4 drops below a predetermined temperature, drain valve 92 opens, draining part of the hot water holding tank 48. Then drain valve 92 closes, and the controller 132 opens holding tank fill valve 96 to fill the hot water holding tank 48 until float level sensor $F_{LO}$ indicates predetermined LO water level 232 has been reached, while monitoring loop temperature T4; (ii) the controller 132 will operate powered 3-way gate valve 72, holding tank fill valve 96, and first effluent pump 100 to maintain the water level in the hot water holding tank 48 above predetermined LO water level 232 and below predetermined HI water level 228; (iii) a manual pause lockout switch 344 ("Yellow Switch Depressed") is a manual safety feature which when activated, tells the controller 132 to stop pumps 100 and 104 and to activate a visual alarm of the visual/auditory alarm 320; so that the filtration stage 208 can be opened to change a filter bag 210 without danger of scalding an operator. Alternatively, a pressure sensor will send a signal to the controller to activate audio and visual alarms to indicate the filter bags needs to be changed. An exemplary manual pause lockout switch includes a safety cover lock for a filter bag 210 collar 212 (not shown); (iv) if leak detector 332 activates, the controller 132 activates the audiovisual alarm 320, and the energy recovery system 12 shuts down.

Figure 5E:
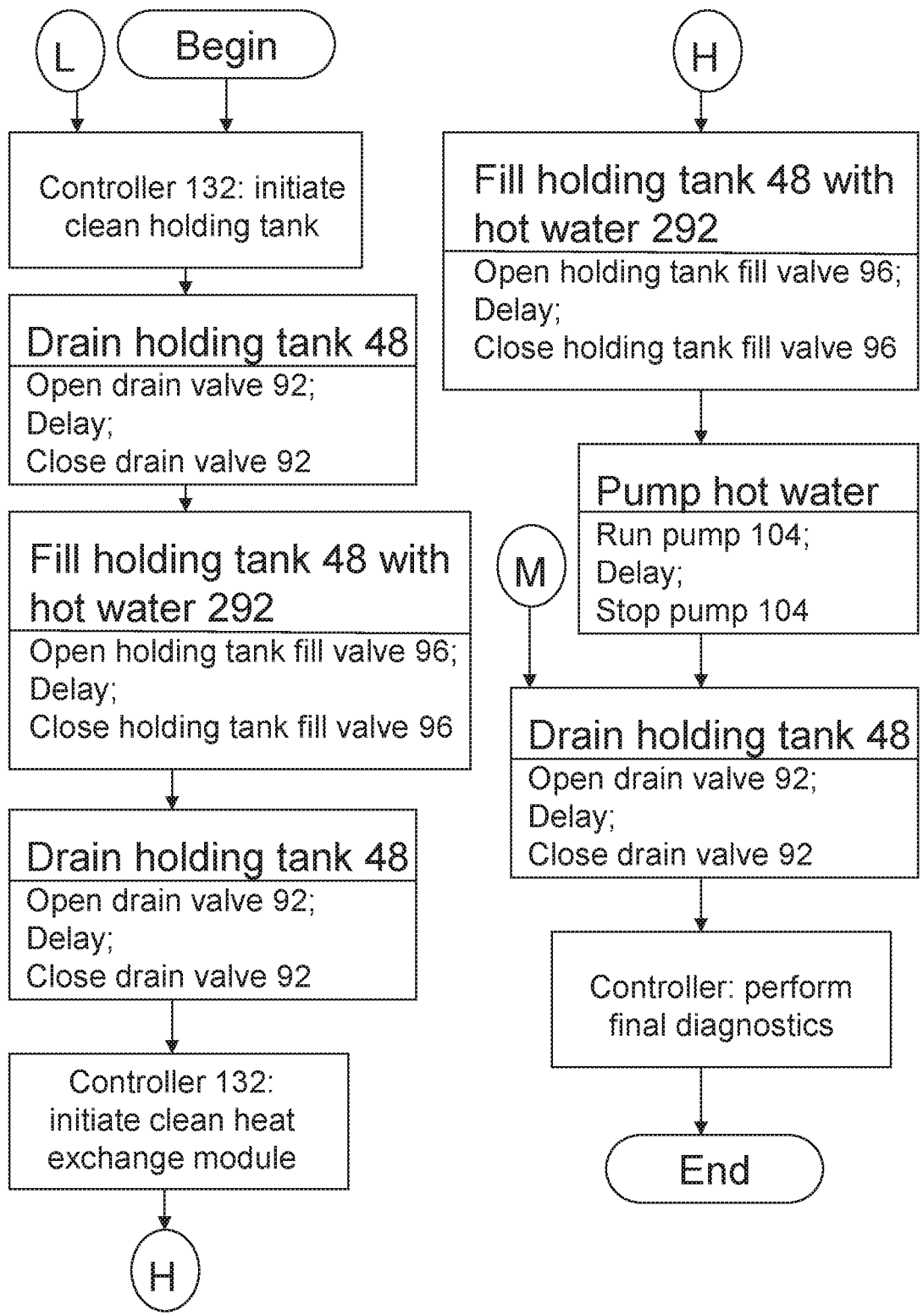

FIG. 5E illustrates the procedure for automated recovery system shut down, which sequence includes procedures to effectively remove effluent 52 from the interiors of the heat exchange module 44, the hot water holding tank 48, the second effluent pump 104, and water lines including send line 66 and return line 68. (Note that upon detection of leaks, this sequence is not initiated.) Upon completion of normal operation or contingency operation, or upon manual shutdown command, the controller 132 opens drain valve 92 to drain the hot water holding tank 48. After a predetermined time delay, the holding tank fill valve 96 is opened, allowing 180° F. (82° C.) water 292 from the booster heater 136 to fill the hot water holding tank 48, effectively cleaning any remaining effluent 52 from the interior sides of the hot water holding tank 48. Drain valve 92 is opened to flush the water 292 to drain line 40. After another predetermined time delay, the holding tank fill valve 96 is again opened, allowing 180° F. (82° C.) water 292 from the booster heater 136 to enter the hot water holding tank 48. The second effluent pump 104 then pumps this hot, clean water through loop 216, i.e. through send line 66, and back through return line 68 to hot water holding tank 48, effectively cleaning any remaining effluent 52 from the interior of the coils in the heat exchange module 44. Drain valve 92 is then opened to flush the water to drain line 40. The controller 132 runs diagnostic checks, communicates any alerts or alarms, and shuts down the energy recovery system 12.

Embodiments of the described recovery system 12 are designed to address overloading of grease traps 200 and prevent solidified waste material in a grease trap from exceeding the threshold melting temperature. Noting that the hot effluent waste water may be cooled from a wash or rinse temperature of about 180° F. (82° C.) by 20° F. (11° C.) or perhaps 40° F. (22° C.), e.g., down to about 140° F. (60° C.) by the time the waste water reaches a grease trap, recovery systems according to the invention can further depress waste water temperatures to 110° F. (43° C.) or lower without tempering, e.g., below 100° F. (38° C.), 95° F. (35° C.), 90° F. (32° C.) or 85° F. (29° C.), depending on the temperature of the potable water received from a municipal supply and the capability of the heat exchange device. Without tempering the effluent 52, temperature reductions of effluent sent to drain line 40 as achievable with the recovery system 12 enable settlement of non-aqueous material in the grease trap 200 for acceptable processing of ware washing effluent volumes which would otherwise exceed the conventional design limitations of the grease trap.

By disposing of this hot ware-washing waste water effluent at such a lower temperature, the recovery system reduces consumption of potable water 140 otherwise used to temper hot effluent. The recovery system may allow for reduction of the size and capital costs of grease traps. With the present invention the volumetric operating capacity of a grease trap is no longer a function of a single variable, i.e., the volumetric flow rate of the waste water effluent. Thus, for an existing grease trap, the recovery system can increase the volumetric effluent loading capacity of the trap and, potentially, the maximum seating capacity of a food service establishment. The recovery system lowers the risk of downstream grease dispersal which can otherwise result from discharging excessive volumes of hot water effluent into the grease trap.

For a given grease trap sizing, having a characteristic heat capacity, and for a given rate of heat diffusion, recovery systems according to the invention enable may reduce required grease trap size and, for an existing grease trap holding capacity, the invention provides an increased volumetric operating capacity. Generally, use of the disclosed recovery system enables an increased volumetric effluent loading of drain systems without exceeding an actual operating capacity for removal of non-aqueous materials.

The invention claimed is:

1. A method of operating a water consumptive industrial appliance for which there is provided a conventional configuration which can supply, on demand, relatively cool potable water which passes along a first path from a water supply and through a first water heater to provide a first flow of heated potable water with which the industrial appliance performs processing, and (ii) selectively discharging a second flow from the industrial appliance comprising relatively hot effluent including the heated water used in the processing, into a drain, or diverting the second flow, after it has been drained from the industrial apparatus, via a thermal recovery line into a holding tank, the method comprising:

connecting a heat exchanging device to provide a heat exchanging flow path whereby heat transfer occurs between the second flow comprising relatively hot discharged effluent and another flow of relatively cool potable water to elevate the temperature of said another flow of relatively cool potable water to provide a second flow of heated potable water wherein said another flow of relatively cool potable water does not first undergo active heating;

positioning the holding tank to receive the second flow of relatively hot effluent prior to entering the heat exchange device via the thermal recovery line, so that the heat exchange device transfers thermal energy from the second flow of relatively hot effluent to the relatively cool potable water to elevate the temperature of the relatively cool potable water to transform the first flow into a flow of relatively hot potable water without active heating and enable the heat exchange device to selectively provide the flow of relatively hot potable water along a second path to the industrial appliance in lieu of actively heating potable water flowing along the first path from the first water heater to the industrial apparatus, wherein the method further includes:

acquiring temperature data to determine whether such a second flow of heated potable water, after being elevated in temperature along the heat exchanging flow path, is suitable for use in the industrial appliance relative to the first flow of heated potable water and, if it is determined that such a second flow of heated potable water is acceptable for use in the industrial appliance, in lieu of a first flow of heated potable water then, after creating the second flow of heated potable water, sending the second flow of heated potable water from the heat exchanging flow path to a booster water heater to further elevate the temperature of the water; and sending the second flow of heated potable water from the booster water heater into the industrial apparatus to perform the processing.

2. The method of claim 1 wherein the step of acquiring temperature data to determine whether such a second flow of heated potable water is acceptable for use in the industrial appliance is based on whether the discharged effluent has a minimum temperature greater than the temperature of the relatively cool potable water before entering the heat exchanging flow path.

3. The method of claim 1 where determining whether such a second flow of heated potable water is acceptable for use in the industrial appliance is based on whether the discharged effluent has a minimum temperature.

4. The method of claim 3 wherein the minimum temperature is at least 140° F. (60° C.).

5. The method of claim 3 wherein the minimum temperature is at least 130° F. (54° C.).

6. The method of claim 3 wherein the minimum temperature is at least 120° F. (49° C.).

7. The method of claim 3 wherein the minimum temperature is at least 110° F. (43° C.).

8. The method of claim 1 wherein, when the temperature of effluent exceeds a minimum value, water heated by the heat exchange device is sent to the industrial appliance, and when the temperature of effluent does not exceed the minimum value, the first flow of heated potable water is sent to the industrial appliance.

9. The method of claim 1 including operating a controller to selectively provide the flow of relatively hot potable water along the second path to the industrial appliance based on a determination that the temperature and volume of effluent available for thermal transfer within the heat exchange device are sufficient to generate a sufficient supply of relatively hot potable water to meet a predetermined condition for operation of the industrial appliance.

* * * * *